United States Patent [19]

Ito

[11] Patent Number: 5,029,085
[45] Date of Patent: Jul. 2, 1991

[54] CONVERSATIONAL-TYPE NATURAL LANGUAGE ANALYSIS APPARATUS

[75] Inventor: Hideo Ito, Tokyo, Japan

[73] Assignee: Ricoh Company, Ltd., Japan

[21] Appl. No.: 521,559

[22] Filed: May 10, 1990

[30] Foreign Application Priority Data

May 18, 1989 [JP] Japan ............................. 1-124891

[51] Int. Cl.$^5$ ............................................. G06F 15/38
[52] U.S. Cl. .................................. 364/419; 364/972.1; 364/274.8
[58] Field of Search ................. 364/419, 900, 917.92, 364/200, 274.8

[56] References Cited

U.S. PATENT DOCUMENTS

| | | | |
|---|---|---|---|
| 4,654,798 | 3/1987 | Taki et al. | 364/419 |
| 4,831,529 | 5/1989 | Miike et al. | 364/419 |
| 4,864,502 | 9/1989 | Kucera et al. | 364/419 |
| 4,914,590 | 4/1990 | Loatman et al. | 364/419 |

FOREIGN PATENT DOCUMENTS

| | | |
|---|---|---|
| 57-132270 | 8/1982 | Japan . |
| 58-101365 | 6/1983 | Japan . |
| 59-140582 | 8/1984 | Japan . |
| 61-18073 | 1/1986 | Japan . |
| 61-80362 | 4/1986 | Japan . |
| 61-90269 | 5/1986 | Japan . |
| 61-278970 | 12/1986 | Japan . |
| 62-271061 | 11/1987 | Japan . |
| 62-290976 | 12/1987 | Japan . |
| 63-98072 | 4/1988 | Japan . |

*Primary Examiner*—Michael R. Fleming
*Assistant Examiner*—Xuong M. Chung
*Attorney, Agent, or Firm*—Mason, Fenwick & Lawrence

[57] ABSTRACT

A conversational-type of language analysis apparatus includes a sentence input unit inputting a sentence, a dictionary unit and a grammar storage unit. The apparatus also includes an all-relationship detection unit dividing into the syntactical units the sentence, the syntactical units being nodes, and detecting, as candidate relationships, all linguistic relationships on the basis of the grammatical rules in the grammar storage units and dictionary information in the dictionary unit, a conversational-type analysis unit selecting correct relationships by conversation interaction with a user from the candidate relationships, the conversational-type analysis unit having conversational object selecting unit for selecting object relationships which are objects of the conversational interaction with the user from the candidate relationships, and conversation unit selecting the correct relationships by conversational interaction with the user. The apparatus also has analysis unit selecting correct relationships without the conversational interaction from relationships other than the correct relationships selected by the conversational-type analysis unit.

11 Claims, 4 Drawing Sheets

CONVERSATIONAL-TYPE NATURAL LANGUAGE ANALYSIS APPARATUS

BACKGROUND OF THE INVENTION

The present invention relates to a conversational-type natural language analysis apparatus that is applicable to a machine translation apparatus, a natural language conversational system and the like.

The "National Language Translation Support System" disclosed in Japanese Laid Open Patent Application No. 140582-1984 relates to a machine translation system that supplies information to support the translation process prior to the performance of syntax analysis. This system uses information that is provided, to translate input sentences. In such a machine translation system, the information that the user has to provide differs according to the input sentence. Accordingly, the user must understand what type of information has to be provided and then select it. This creates a large load for the user. Such a type of machine translation system is termed a "pre-edit" type of system.

The "Text Display & Correction Apparatus in a Machine Translation System" disclosed in Japanese Laid Open Patent Application No. 101365-1983 relates to a machine translation system in which the sentence is first generated and the input original sentence and the corresponding translated sentence are compared by the user in predetermined units and the user corrects the translated sentence in those units.

In addition, in the "Machine Translation System" disclosed in Japanese Laid open Patent Application No. 271060-1987, the translated sentence corresponding to the input original sentence is first generated and if the user requires a different translated sentence, re-translation is performed by using the one candidate from a set of candidate syntactical relations that could be used and which has the highest possibility (evaluation score) of being correct. Furthermore, in the above described Japanese Laid Open Patent Application No. 271060-1987 is also disclosed a "Machine Translation System." In this machine translation system, the translated sentence corresponding to the input original sentence is first provided and then if the user judges that there is an error in that translated sentence, the user specifies the modifier clause of the input original sentence and candidate modified clauses are provide. Then, the user selects and specifies the candidate modified clause that is the most suitable from the list of modified clauses provided for the user. This system performs retranslation using the modified clause that was specified as corresponding to the modifier clause of the input original sentence. These machine translation systems are termed "post-edit" type systems.

In such "post-edit" type systems, it is difficult to perform complete automatic and analysis using current technology. Accordingly, the user must either make judgments as to whether the translated sentence provided by the system is correct or incorrect, and perform the correction of the translated sentence if it is wrong. This work represents a large workload for the user.

The "Correction Method" disclosed in Japanese Laid Open Patent Application No. 18073-1986 displays an analysis tree as the results of analyzing the input original sentence and the user then uses basic commands to correct the analysis tree that is displayed.

In addition, in the "Control Method for Syntactical Analysis Results Display & Correction" disclosed in Japanese Laid Open Patent application No. 278970-1986, the system expresses and analysis tree in a small amount of space as the result of analysis of the input original sentence and then the system receives corrections that the user makes to that analysis tree. These types of systems are termed "mid-edit" systems.

In such "mid-edit" systems, the meaning of the analysis results such as analysis tree and the like is difficult to understand for a general user who does not understand the mechanics of the operation. In addition, the user must not only the correction of error analysis but must also make judgments as to the correctness or incorrectness of correct analysis results. This represents a large burden for the user. The "Human Intervention Method for Causes of indeterminable Meaning in Machine Translation" disclosed in Japanese Laid Open Patent Application No. 132270-1082 relates to a machine translation system. In this machine translation system, syntactical structures for which the meaning cannot be determined are displayed and information is presented to the user in order to determine the meaning, and the given information is used for translation. Such a type of machine translation system is termed a "conversational-type" machine translation system. In the case where many sentences have to be translated, the number of meanings cannot be determined becomes considerably large and providing the user with the information required to determine the meaning is unrealistic in practical terms. Accordingly, it is desirable that the extent of the indeterminable meaning be considered and that the syntactical structure that requires information from the user be selected.

In addition, the "Translation Method" disclosed in Japanese Laid Open Patent Application No. 80362-1986 and Japanese Laid Open Patent Application No. 90269-1986 related to machine translation systems. In these machine translation systems, the syntax of the input original sentence is performed and the relationships for the configuring elements that form the analysis results are presented to the user. Then, the user checks these analysis results, and when the user judges a relationship to be incorrect, the user then specifies a correct relationship and the system performs re-translation in accordance with that specification.

When many sentences have to be translated, the number of relationships for the configuring elements becomes large to the extent that it is no longer realistic in practical terms for the user to make judgments about the correctness or incorrectness for all such relationships. Accordingly, it is desirable that the number of judgments that the user has to make be limited to only vague relationships and unclear portions and the like.

In addition, the "Translation Support Apparatus" disclosed in Japanese Laid Open Patent Application No. 290976-1987 also relates to a machine translation system. When a vague or unclear portion is generated in the process where the input original sentence is analyzed, question and response is performed for between the user and the system and the information obtained is used to progress with the analysis. When this is done, the load on the user is lessened if the user is questioned in an easy-to-understand manner and in accordance with type and contents of a vague or unclear portion, so that the user can respond promptly.

When many sentences have to be translated, the number of these vague or unclear portions increases considerably and it is a great load on the user to gave to make judgments for all of these. Accordingly, it is desirable that the questioning be performed for those items for which there is a large degree of vagueness or lack of clarity.

In addition, the "Vague Modifier Relationship Detection Method" disclosed in Japanese Laid Open Patent Application No. 98072-1988" relates to a natural language conversational-type system. In this natural language conversational-type system, analysis is performed for the sentence in question, vague modifier relationships are detected, and all possible modifier relationships are presented to the user who then makes a selection. Then, the modifier relationship that is selected by the user, is used to perform a correct analysis. The vague modifier relationship is detected by the use of a vague modifier patterns that are stored in the system.

When there are a large number of sentences to be translated, the number of these vague modifier relationships becomes considerably large and it becomes a large load for the user to make judgments for all of them. In addition, there are many types of vagueness that a sentence can have and it is difficult to have patterns for all types.

The technology for the analysis of language is still not mature and it is difficult to have complete and automatic analysis. There are basically two methods for the solution of this problem. One of these methods is to (1) limit the number of objects of analysis and the second method is to (2) limit the degree of automation of analysis. The present invention relates to the latter method. There are four methods for limiting the degree of automation. They are as follows, for the respective types of translation method.

(2)-1 Pre-edit type: Having the user perform prior edit for the original sentences to make them into a form in which they can analyzed by the system.

(2)-2 Post-edit type: In a process that uses machine translation and language analysis results, having the user correct the final results of the system for processing.

(2)-3 Mid-edit type: Having the user perform correction of the language results of the system themselves.

(2)-4 Conversational-type: Having the user cooperate and perform the analysis.

The present invention relates to this fourth method.

The problem with the method (1) is that it is difficult to confirm whether the original that has to be analyzed is within the limits or not. The problems for (2)-1, (2)-2, (2)-3 are as described above but this problem does not apply to (2)-4. The problems with the conventional technology for (2)-4 have already been described but the common problem is that "the total number of portions that cannot be determined by the system becomes larger when many sentences have to be translated." It is unrealistic that user supports all of them.

SUMMARY OF THE INVENTION

Accordingly, a general object of the present invention is to provide a novel and useful conversational-type natural language analysis apparatus in which the disadvantages of the aforementioned prior art are eliminated.

A more specific first object of the present invention is to provide a conversational-type natural language analysis apparatus in which the number of times of user assistance is reduced by estimating the degree of difficulty of analysis by the system and in accordance with this degree of difficulty, limitting the objects for which user support is required.

In addition, there is no meaning in support from the user unless the correct interpretation rate of analysis is improved. This is to say that, assuming that analysis results the same as those performed by judgment by the system itself were obtained without support from the user, then any support from the user would be pointless. A second object of the present invention is to provide a conversational-type natural language analysis apparatus in which an improvement in analysis ratio obtained by one support from user always becomes maximum so that the amount of such pointless support can be reduced.

In addition, it is not necessarily true that the analysis performance of a system is constant. It can be improved by maintenance with dictionary rules and grammar. A third object of the present invention is to provide a conversational-type natural language analysis apparatus in which the analysis performance is improved and at the same time the load on the user is lightened so that the load on the user is maintained at an appropriate amount.

The above mentioned objects of present invention is achieved by a conversational-type of language analysis apparatus comprising sentence input means for inputting a sentence in a language which is an object of analysis, dictionary means for having an attribute with respect to a syntactical unit of the language, as dictionary information, grammar storage means for having grammatical rules which are applied to the language all-relationship detection means for dividing into the syntactical units the sentence input by the sentence input means, the syntactical units being nodes, and detecting, as candidate relationships, all linguistic relationships which have possibility of existing for between the nodes on the basis of the grammatical rules in the grammar storage means and the dictionary information in the dictionary means, conversational-type analysis means for selecting correct relationships by conversational interaction with a user, from the candidate relationships detected by the all-relationship detection means, the conversational-type analysis means having conversational object selecting means for selecting object relationships, which are objects of conversational interaction with the user and satisfy predetermined condition, from the candidate relationships, and conversation means for selecting the correct relationships by conversational interaction with the user from the object relationships, and analysis means for selecting correct relationships without the conversational interaction from relationships other than the correct relationships selected by the conversational-type analysis means from the candidate relationships.

Moreover, although it is desirable that the analysis ratio be 100%, this is not absolutely necessary. For example, when the present apparatus is used in a translation system, there is no problem if the analysis ratio is about 80%. A fourth object of the present invention is to provide a conversational-type natural language analysis apparatus that can control the number of times when support is required of the user so that it is in accordance with the analysis ratio required by the user, and therefore allow the user to adjust the user load suitably.

Moreover, the above mentioned objects of present invention is achieved by the conversational-type of language analysis apparatus wherein the conversation means has determination means for determining the number of times of the conversational interaction with the user.

Other objects and further features of the present invention will be apparent from the following detailed description when read in conjunction with the accompanying drawings.

DESCRIPTION OF THE PREFERRED EMBODIMENT

Figure 1:
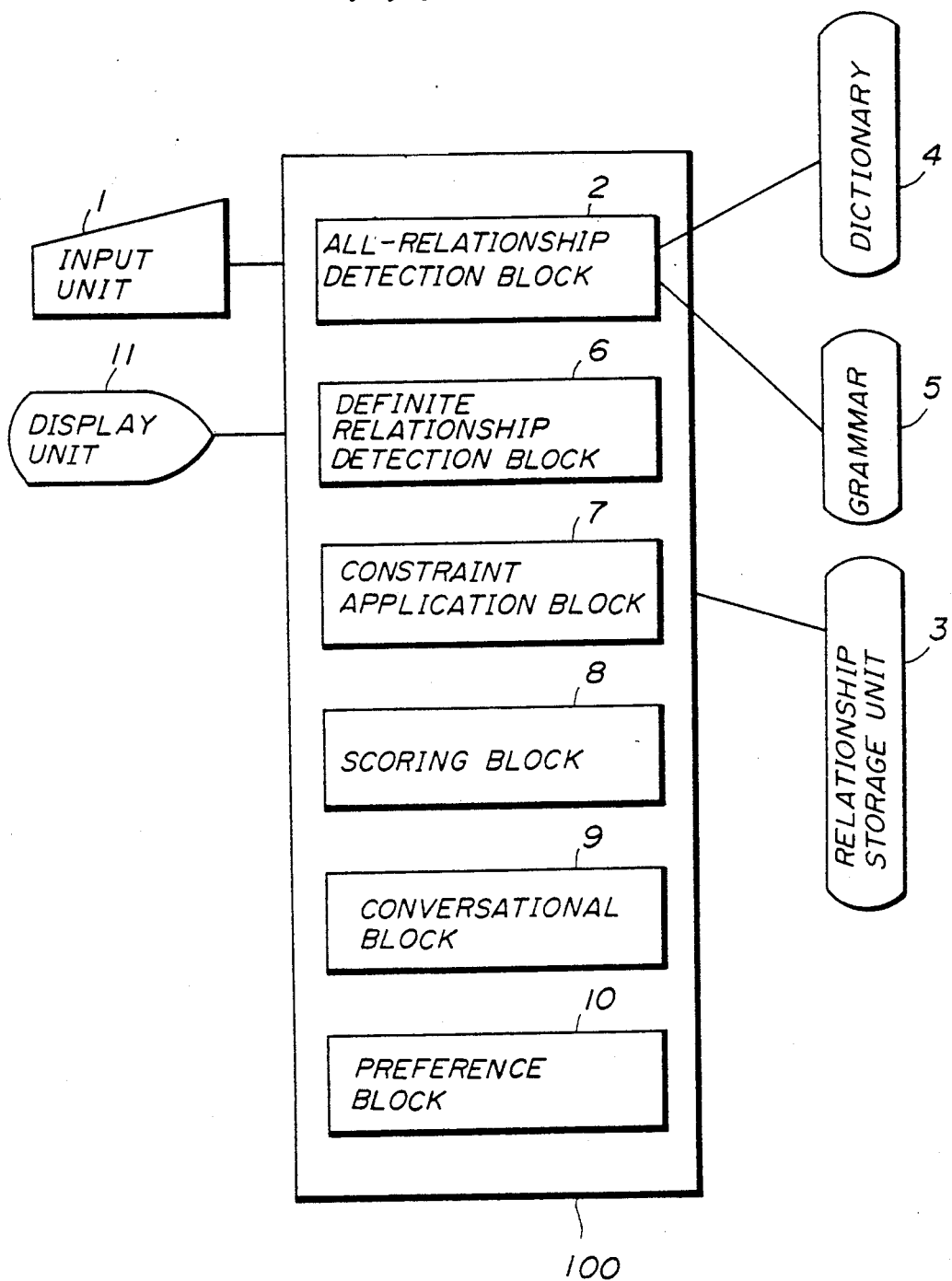
FIG. 1 is a block diagram for describing an embodiment of a conversational-type natural language analysis apparatus according to the present invention.

The following is a description of a basic configuration of the conversational-type natural language analysis apparatus of an embodiment according to the present invention.

An input unit 1 inputs the information of the input original sentence in order to perform language analysis. This input unit 1 includes for example, a keyboard, and an optical character reader (OCR). A processing unit 100 includes as its functional blocks an all-relationship detection block 2, a definite relationship detection block 6, a constraint application block 7, a scoring block 8, a conversational block 9 and a preference block 10. The processing unit 100 is generally configured from computer devices, and each of the described above functional blocks is realized by computer device hardware and software. A dictionary 4 contains parts of speech of words, idioms and clause meaning. A grammar 5 has the modifier relationships (connection relationships) for each of the words, combination words and clauses, etc. The dictionary 4 and the grammar 5 are configured by a memory and the information of the dictionary and the grammar described above is stored in the memory. A relationship storage unit 3 stores the modifier relationships of each of the words, idioms and clauses and the like obtained by the processing of the processing unit 100. This relationship storage unit 3 is configured by a memory. The information for the modifier relationships and that is stored in this relationship storage unit 3 is used for machine translation and the like. A display unit 11 includes a CRT display and an LCD display device or the like. This display unit 11 displays the results of the various types of processing performed by the processing unit 100. In addition, the input unit 1 is also a conversational-type interface for the user. The user supplies necessary information to the processing unit 100 from the input unit 1.

The specific processing for each of the blocks in the processing unit 100 will be described later.

Figure 2:
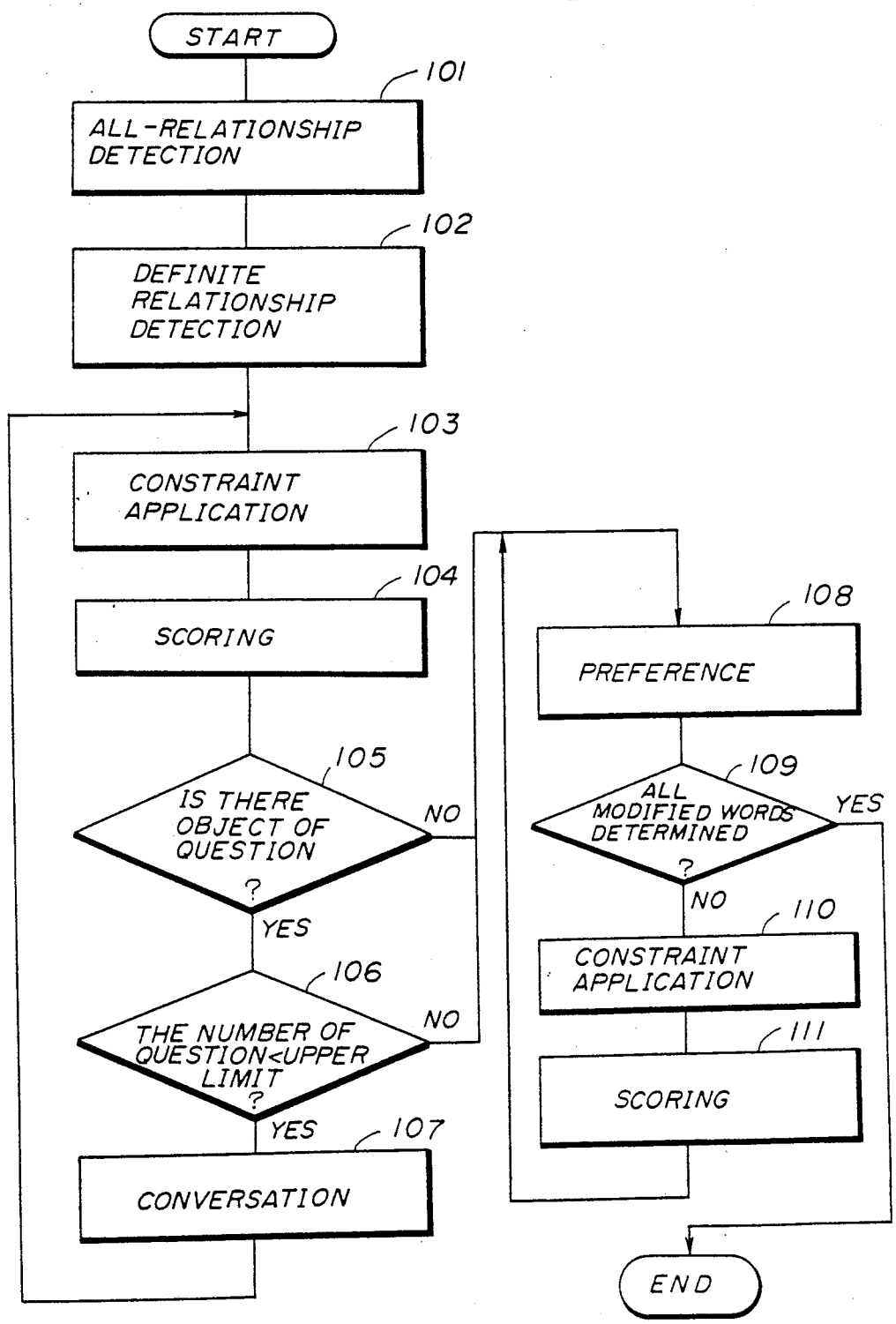
FIG. 2 is a flow chart for describing the operation of a conversational-type natural language analysis apparatus according to the present invention.

The following is a description of the operation of a conversational-type natural language analysis apparatus having the configuration described above, with reference to the flowchart indicated in FIG. 2.

A user inputs an English sentence such as "Time flies like an arrow today." for example, from the input unit 1. When this is done, in step 101, processing is performed by the all-relationship detection block 2. The all-relationship detection block 2 divides the input original sentence from the input unit 1 into a plural number of words. In this case, there are six words that from the syntactical units of the sentence. These words are "Time", "flies", "like", "an", "arrow" and "today". These words are nodes. Then the all-relationship detection block 2 gives suitable word vocabulary information stored in the dictionary 4. Each word, for example, is given the vocabulary information that is shown in Table 1. In this case, the word vocabulary information are the candidates for the part of speech of each word.

TABLE 1

| Word | Candidate part of speech |
|---|---|
| Time | noun, verb |
| flies | noun, verb |
| like | verb, preposition |
| an | article |
| arrow | noun |
| today | adverb |

Then, the all-relationship detection block 2 uses the above described vocabulary information for each word and the modifier-modified relationships stored in the grammar 5 to generate all possible modifier-modified relationships for each word and then stores these generated modifier-modified relationships in the relationship storage unit 3.

The modifier-modified relationships and the relationship names are indicated in Table 2.

TABLE 2

| | Modifier | | Modified | Relationship name |
|---|---|---|---|---|
| (1) | Time | → | flies | noun-verb |
| (2) | Time | → | flies | noun-noun |
| (3) | flies | → | Time | noun-verb |
| (4) | flies | → | like | noun-verb |
| (5) | like | → | flies | preposition-verb |
| (6) | like | → | Time | preposition-verb |
| (7) | an | → | arrow | article noun |
| (8) | arrow | → | like | noun-verb |
| (9) | arrow | → | like | noun-preposition |
| (10) | today | → | Time | adverb-verb |
| (11) | today | → | flies | adverb-verb |
| (12) | today | → | like | adverb-verb |

In the 12 types of relationship (1) through (12) indicated in Table 2, relationships (1) and (2) are the same time of modifier-modified relationship (Time→flies) but the names of relationship (1) and (2) are different. The same is true for relationship (8) and (9). The modifier-modified relationships in Table 2 are indicated as follows.

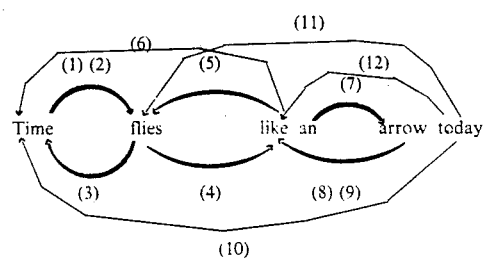

For example, "like" has the possibility of modifying the two words "Time" and "flies". In addition, "today"

has the possibility of modifying the three words of "Time", "flies" and "like". In the step 102 that follows step 101, the processing is performed by the definite relationship detection block 6.

The definite relationship detection block 6 checks the 12 types of modifier-modified relationship information (1) through (12) stored in the relationship storage unit 3 and then detects those modifier-modified relationships that have already been determined as they are not dependent upon other relationships. Then, appropriateness marks ("determined" marks) are given to that relationship information. In the example indicated in Table 2, the relationship information (7) (an→arrow) is detected as a modifier-modified relationships that has already been determined. This is to say that "an" has only the possibility of being related to "arrow". This relationship is not influenced by the other relationships.

After step 102, the processing of step 103 is then performed by the constraint application block 7.

In general words, the following restrictions are established in practically all cases.

(A) Unity of modified: There is usually only one word or clause that is modified by each word or clause or the like.
(B) Non-crossing of modifier-modified relationship: In the sentence, a word between the words connected by modifier-modified relationship is not connected, by the modifier-modified relationship to a word outside the connected words.

These restrictions generate exclusiveness between the modifier-modified relationships. For, example, if one of the relationships between words (a) and (b) and between (a) and (c) (where c≠b) is right, the other relationship is wrong due to the unity of modifier (i.e. exclusiveness). In the 12 relationships indicated in Table 2, for example, if the relationship information (5) (like→flies) is right, then the relationship information (6) (like→Time) is wrong (rule (A) described above). If the relationship information (6) (like→Time) is right, then the relationship information (11) (today→flies) is wrong (rule (B) described above).

A certain modifier-modified relationship is determined by some kind of processing. When this is done, the all of the modifier-modified relationships that are exclusive due to the restrictions described above are deleted from these modifier-modified relationships. This type of processing is called a constraint application. In the relationship storage unit 3, determination marks are given to the determined relationship information. Accordingly, when the constraint application block 7 search for that relationship information inside the relationship storage unit 3 and detects determination mark, the constraint application processing is performed for relationship information that have been given determination marks.

In an embodiment according to the present invention, after processing by all relationships detection block 2, there are three opportunities for determining the modifier-modified relationships. They are as follows.

(1) In the processing for the detection of the determined relationships: As has been described above, this is when the modifier-modified relationship is already determined from the beginning.
(2) In the specification by the user: This is when the modifier-modified relationship is specified by conversational specification by the user using a method to be described later.
(3) In the preference by the system: The preference will be described later.

In the embodiment, these determinations are made and then constraint application is always performed. Doing this takes the fullest advantage of the determination information.

What is important here is that even if the modifier-modified relationship is deleted by the constraint application, the restrictions that have been described above are almost certainly established and so a correct modifier-modified relationship will not be erroneously deleted. Therefore, in this embodiment according to the present invention, the possibilities for deleting a correct answer exists in only the case (3) where the preference by the system is performed.

That is, only the determined relationship detection and the constraint application are performed prior to the conversational interaction and the preference by the system is not performed until the conversation interaction is completed so that it is guarantees that conversational interaction that always includes a correct answer is performed.

The processing of step 104 that is performed after the constraint application processing of step 103, is for the scoring processing. This processing is performed by the scoring block 8.

In this processing, scores are given to all of the modifier-modified relationships that have not been deleted in the processing for the constraint application. Differences in the scores between modifier-modified relationships must have some significance. This is to say that in cases where there are two modifier-modified relationships that are exclusive, then the more difficult it is to determine which of the two is the correct one must be reflected in a smaller absolute value of the difference between the two scores. This embodiment according to the present invention uses the modified probability (i.e. the probability that the word is modified by another word) as the score that satisfies this condition.

Method for Determining the Modified Probability

In general, the modifier-modified grammar is expressed by using a modifier word attribute, a modified word attribute and a relationship name. Below, the modifier-modified are assumed.

Modifier-modified grammar: k
Modifier word attribute: A1
Modifier word attribute: A2
Relationship name: LABEL Then, it is assumed that the grammar k generates the modifier-modified relationships between the pair of words a and b.

Therefore, when
the probability that the modified grammar k is established: P1
the probability that the word a has the attribute value A1:P2
the probability that the word b has the attribute value A2:P3
the score s(a,b,k) of the modifier-modified relationship for the word pair a and b by the grammar K is:

$$s(a,b,k) = \sum_i \frac{W_i P_i}{R}$$

$$\left( \text{where } W_i \text{ is a constant and } R = \sum_i W_i \right)$$

When plurality of the modifier-modified grammars generate the same modified relationship, the relationship having the largest value can be used. In addition, in the above, Wi expresses the importance of each of the probabilities. Accordingly, it is necessary that Wi is determine an appropriate value for each grammar.

In this manner, the above scores are determined for all of the candidate words that word a can modify. Then, when the scores for the modifier-modified relationships of the word pair a, b are expressed, the scores are then calculated as follows.

$$s(a,b) = \frac{s(a,b,k)}{W}$$

$$\left( W = \sum_i s(a,i,k_i) \right)$$

In this calculation, if W1=1, W2=W3=0, then only probability P1 of the modifier-modified grammar is the score.

The probability of the modifier-modified grammar can be easily calculated by using the number of times that the modifier-modified grammar has been already applied to a pair of words and the number of times that the modifier-modified grammar is correct. The calculation for the probability of a certain word having an attribute value is also calculated in the same manner. When this apparatus is used, data relating to these number of times of application and number of correct answer is stored and the probability recalculation is performed so that the accuracy of the probability is raised each time the processing is performed. Learning is therefore performed in this manner for the system.

In addition, the W is a constant such as a normalized constant. The value for W is renewed each time relationship information has been deleted by the application of the restrictions and the score is recalculated so that a more appropriate score is always obtained.

Also, in the calculation described above, correctly determining and using W1, W2, W3 and P2 and P3, enables the type (the kind of word from which it is formed, etc.) of modifier word and the type of modified word to be reflected in the score.

When the processing for the score is completed, the judgment processing in step 105 and 106 is performed and then the conversational interaction of step 107 is performed.

In this conversational interaction, the modifier-modified relationships are determined by conversational interaction (Question and answer) between the user and the system. In this conversational interaction, questions and responses from the user to the system are performed via the input unit 1 and the questions.responses from system to the user are performed via the display unit 11. This conversational interaction is performed by the conversational block 9 and using the following procedure.

(1) Groups are formed with elements of relationship information that are mutually exclusive.
(2) Pairs of the highest scores is determined for each pair of scores and then the groups are sorted into the order of groups with descending differences of scores.
(3) The difference of the scores is determined for each pair of scores and then the groups with descending differences of scores.
(4) In the head of the groups which are sorted as has been described above, if that score difference is less than a predetermined constant X, then it is judged to be difficult to determine the modifier-modified relationship and the relationship information of that group becomes a candidate for conversational interaction.
(5) The word that is the modified word with respect to the modifier word in the relationship information that has become the candidated for conversational interaction is put to the user. Then, when the user provides an answer, a determination mark is given to that relationship information (modifier-modified relationship) corresponding to that answer.
(6) When a determination mark has been given to the relationship information in accordance with the answer from the user, the processed group is deleted from the head of the sorted groups. Then, the processing shifts to the restriction application processing of step 103.

In this manner, the looped processing of conversation interaction→constraint application→scoring→conversational interaction is repeated. The processing is this loop continues until either of the two following conditions are satisfied, and then shifts to the preference processing of step 108.

Completion condition 1: Until the score difference of the group at the head of the sorted groups is larger than a value x. This completion condition 1 is applied in the processing for step 105 for judging whether or not there is an object to the question.

Completion condition 2: When the amount of conversational interaction (number of questions) relating to the sentences so far is equal to a predetermined value Y. This completion condition 2 is applied in the processing of step 106 for judging whether or not the number of questions has reached a value for an upper limit.

This processing described above has the following meaning.

In consideration of the user determining all of the modifier-modified relationships by the conversational interaction, then the processing for n number of words will be completed with n−1 questions and answers. However, when many sentences have to be analyzed, this represents a great load for the user. Therefore, the degree of difficulty of the system selecting the relationship information is determined and the conversational interaction is performed in the order of those items of relationship information for which the degree of difficulty is greatest so that it is possible to suitably lighten the load on the user.

The degree of difficulty when the system selects the relationship information should desirably be determined in an easy manner.

In this embodiment according to the present invention, the determination of the degree of difficulty uses the difference between the highest score and the next highest score for the modifier-modified relationship relating to the words inside the group that has exclusive modifier-modified relationships. This score difference is easily determined and moreover, is also used in the processing for the preference to be described later.

Moreover, by making the object of the conversation interaction groups ordered by the smallness of the score difference it is possible for the improvement of the analysis ratio due to user support to always be at its highest.

By only performing conversational interaction when the score difference is smaller than a predetermined constant X, the object of the conversational interaction is limited so that the system performance is improved and the number of occasions of conversational interaction is reduced so that the load on the user is automatically lightened. This is to say that it is possible to always maintain the user load at an appropriate level. This is by the following reasons. The system analysis performance is always being improved by the provision of dictionaries, grammars and other types of data, and also by the learning process. The upgrading of the system analysis performance is reflected in the accuracy of scoring. This is to say that improving the analysis ratio enlarges the differences between scores and makes it easier to select the correct response. In addition, the scores become more reliable for the larger the difference and the value of the constant X can also be determined to a larger value so that it is possible to further reduce the number of questions for conversational interaction.

In addition, by determining the constant Y as the upper limit for the number of questions, and by making the value of this constant Y arbitrarily settable by the user, it is possible for the user to adjust the user load to a suitable amount. This is to say that it is necessary to increase the value of the constant Y for the higher the quality of analysis results that is required.

This processing determines the words that are modified and to do this uses the scores given to each of the candidate modified words that do not yet have their modifiers determined. This determination is performed by the processing for the preference of step 108.

This processing for the preference is performed by the preference block 10 in the processing unit 100 and using the following procedure.
  (1) Some method is used to select one piece of answer relationship information from the relationship information candidates.
  (2) A determination mark is given to that relationship information which was selected as the answer.
  (3) Then, in step 109, a judgment is performed for whether or not all relationship information has been determined and then the processing shifts to step 110 for the constraint application that has already been described.
Then, the scoring processing that has been described above is performed (step 111) and the processing returns to the priority interpretation processing (step 108).

In this manner, the loop of preference (step 108)→constraint application (step 110)→scoring (step 111)→preference (step 108) is repeated until all of the processing for analysis has been completed.

In this case, the selection of the relationship information of the answer is performed according to the following procedure.

In the same manner as for the conversational interaction described above, the highest score and the next highest score is determined for each of the groups of relationship information that are exclusive. Then, the groups have selection processing performed starting from the group for which the score difference is highest. In this selection processing, the relationship information that has the highest score is selected as the answer. When the relationship information is determined, that is to say, when the word that is the modified word is determined, there is the possibility a word which is not modifying anything may occur. It is necessary to perform backtracking in cases such as this.

In this manner, the score characteristic of the determination of the relationship information being easier for the larger the score difference is used in order to heighten the correct answer ratio of the system.

When this processing has been completed, the relationship storage unit 3 has the relationship information that has had determination marks give to it set as the final analysis results. In the case of the example in Table 2, determination marks are given to the relationship information (1), (5), (7), (9), (11). These modifier-modified relationships are as follows.

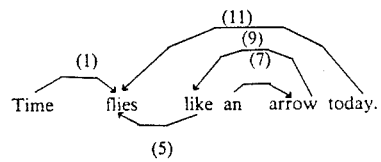

In addition, the processing procedures for the other preference is then checked next.

Figure 3:
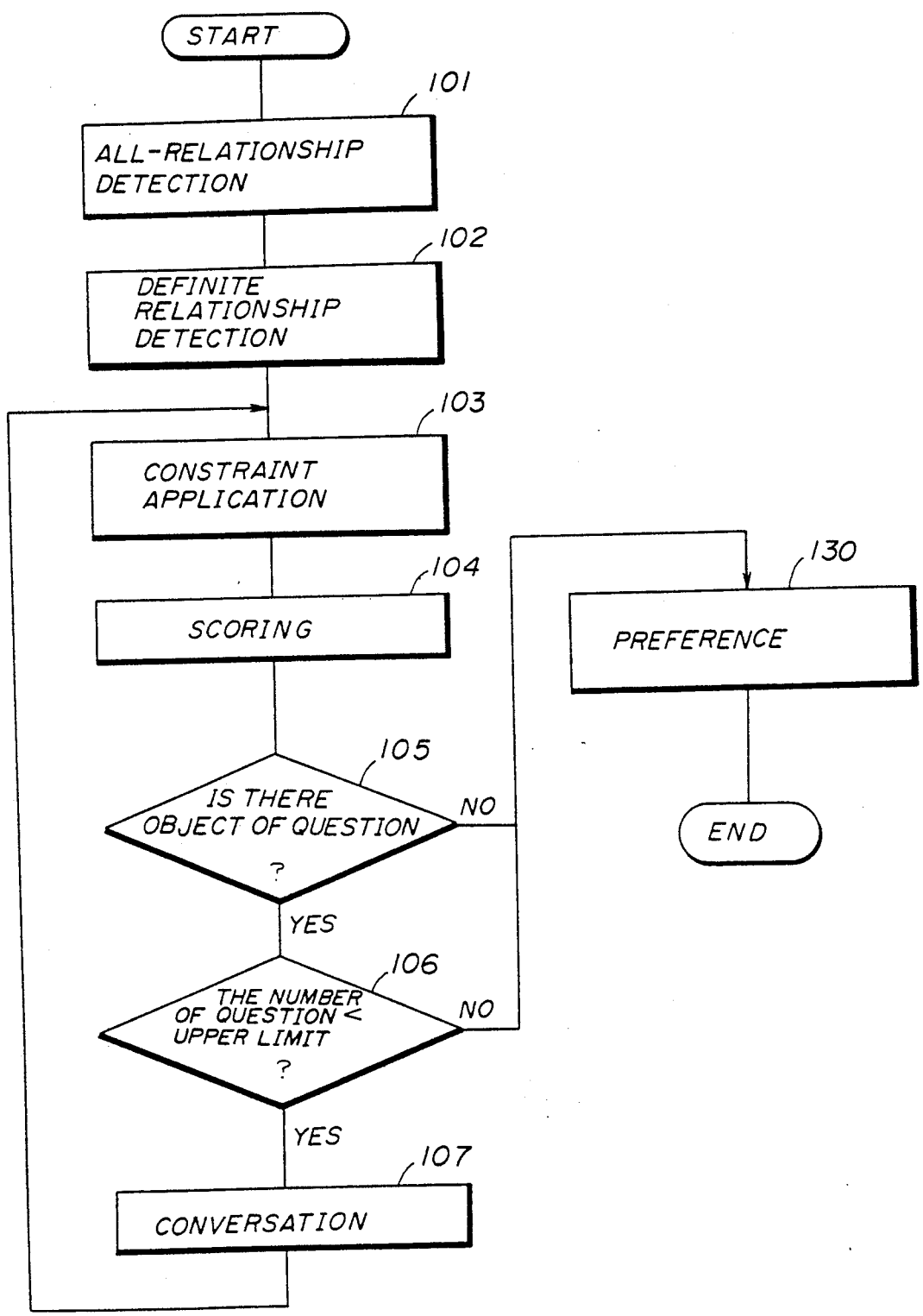
FIG. 3 is a flow chart indicating the operation of another embodiment of a conversational-type natural language analysis apparatus according to the present invention.

The processing for the other preference is, as indicated in FIG. 3, performed in the final step 120 after the completion of the processing for the all-relationship detection (step 101), the determined relationship detection (step 102), the constraint application (step 103), the scoring (step 104) and the conversational interaction (step 107), etc.

All of the possible modifier-modified relationships are generated, as candidates, with respect to all of the words for which modifier-modified relationships are not determined. Groups of candidates for which exclusive modifier-modified relationships do not exist according to the restrictions described above are generated. In each group, a total sum of scores of the candidates is calculated. The total sum of these scores is called the candidate group score. Of these possible modifier-modified candidate groups, only that candidate group which has the highest candidate group score is taken and the modifier-modified relationships (candidates) included in that group are all determined.

In step 120 for the preference indicated in FIG. 3, a local point of view (i.e. the determination of the word modified by a single word) is not taken in the processing in step 108 for the preference processing of FIG. 2, and the selection is performed from a comprehensive point of view. Therefore, a high accuracy of judgment by the system can be expected.

The following is a description of the supplementary functions.

In sentences where there are many words, there are many possible modifier-modified relationships. Here, when a plurality of sentences are analyzed, the processing is separated into the processing for step 101 through step 104 and the other processing, and the results of processing for the former are held in a suitable storage unit. Then, when the former processing has been completed for all of the sentences, the remaining processing is performed while recalling the results of processing for the former processing. Doing this allows the user to concentrate the conversational interaction into one session, so that time with respect to the conversation interaction saves.

Figure 4:
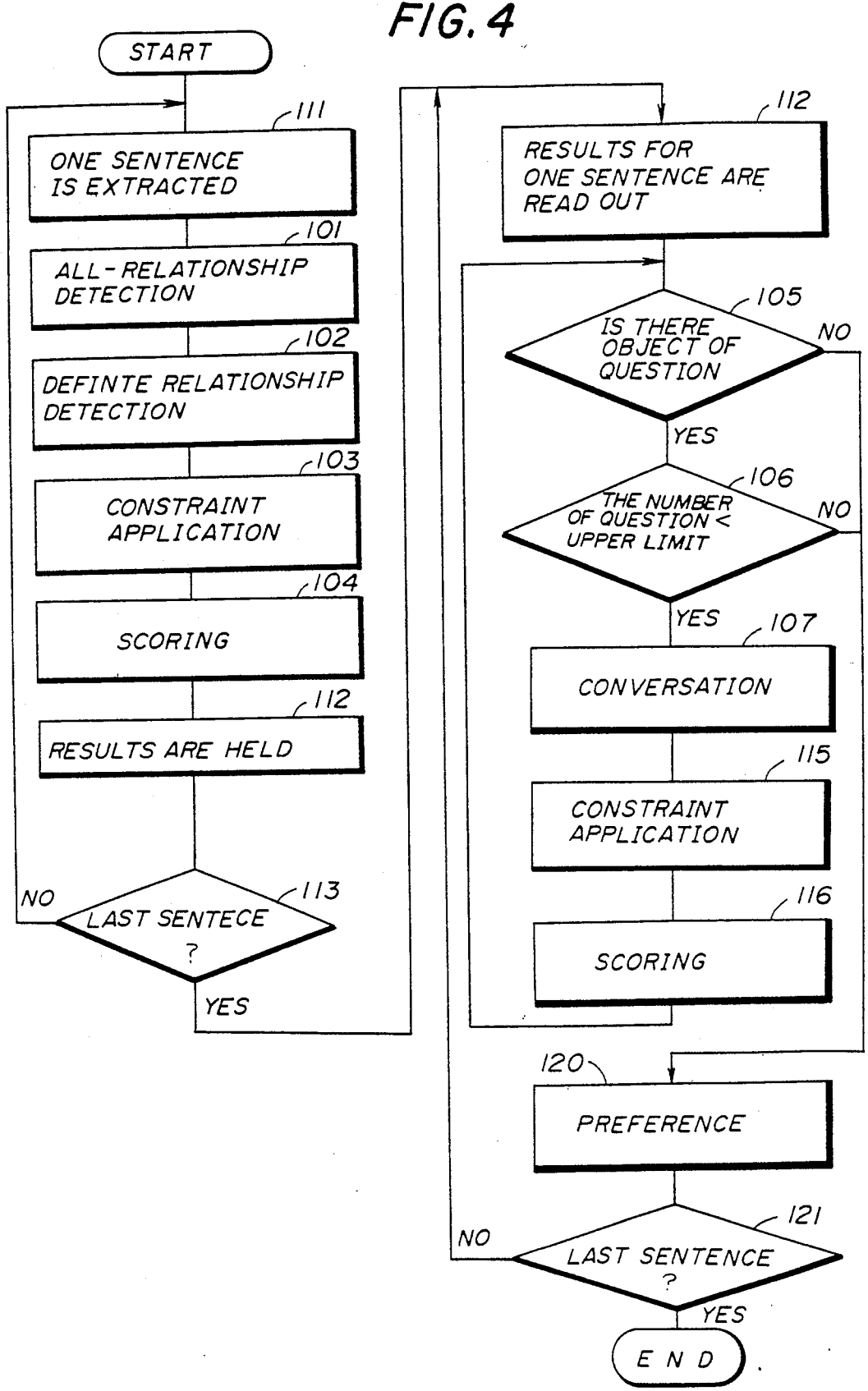
FIG. 4 is a view indicating the operation of still another embodiment of a conversational-type natural language analysis apparatus according to the present invention.

Processing such as this is specifically indicated in FIG. 4. In FIG. 4, in step 111, one sentence is extracted from a plural number of sentences and then the previously described all-relationship detection (step 101), the determined relationship detection (step 102), the constraint application (step 103) and the scoring (step 104) processing are performed with respect to the extracted sentence. Then, in step 112, the results of the scoring are held in a suitable storage unit. This processing is then performed for all of the sentences. In step 113, when it is judged that the processing has been completed for the last sentence, the processing shifts to step 114 where the results of the above scoring are read for one sentence from the storage unit and those scoring results are used as the basis for the performing of the conversational interaction processing (step 107) described earlier. Then, the processing for the constraint application (step 115) and the scoring (step 116) is performed. Furthermore, if it is judged in step 105 that there is no object for questioning, or if it is judged in step 106 that the upper limit for the number of questions has been reached, then the preference (step 120) is performed. This processing is performed on the basis of the score results for all of the sentences that have been stored in the storage unit and ends when the analysis has been completed for all sentences.

It is desirable that the user be able to freely select whether to use the processing indicated in FIG. 4, or the processing that is indicated in one of FIGS. 2 and 3. This selection of the form of processing is easily implemented by the system asking the user prior to the commencement of processing, whether the processing indicated in FIG. 4, or the processing that is indicated in one of FIGS. 2 and 3 is to be used.

The natural language analysis apparatus according to the present invention can be used as a language analysis unit within various types of applications. The present invention is not limited to the types of applications that have been described here but can produce a synergetic effect when used in machine translation system. This is to say that generally, in machine translation systems, the analysis error ratio is higher than the transfer error ratio. Accordingly, it is efficient to emphasize support of the user for the analysis. In addition to this, it is possible to improve the quality of the translated results by improving the analysis ratio even if the user has a knowledge of only the language of the original text, and little knowledge of the language of the translated text.

In the embodiment described above, the words that form the object of analysis are English language words and the syntactical units are words. However, the present invention is not limited to having words as the syntactical units, as word combinations can also be used. In addition, the syntactical units can also be divided words such as [go][ing] which is the word [going] after it has been divided. Furthermore, clauses can be used as the syntactical units in the case of the Japanese language.

As is clear from the above description, it is possible for the present invention to obtain the following effects.

It is possible to reduce the number of times of user assistance by first estimating the degree of difficulty of analysis by the system and in accordance with this degree of difficulty, limit the objects for which user support is required.

It is possible to easily calculate the probability and to have the operator make intuitively determinations when compared with other arbitrary scores.

It is possible to finely calculate scores in accordance with the types of nodes.

By automatically reducing the load on the user in accordance with the improvement of the analysis performance of the apparatus, it is possible to maintain the user load at a constant level.

It is possible for the user to adjust the user load to a suitable level.

It is possible for one support (conversational interaction) to be used to the maximum.

It is possible to always guarantee that a correct answer will be included in the object candidates that are questioned to the user.

It is possible to give a suitable score by reflecting previous analysis results in the score.

It is possible to use the nature of the score since the difference has a significance (in that one of the alternatives is relatively easier to establish if the difference is large) and therefore increase the correct analysis ratio for the judgments of the system.

It is possible to use the nature of the score since the difference has a significance (in that one of the alternatives is relatively easier to establish if the difference is large) and therefore have correct system judgments.

By making the scores into more suitable values, it is possible to increase the analysis ratio and lighten the user load.

It is possible for the user to shorten the batch time.

It is possible for the user to select a suitable batch time by selecting the form of usage in accordance with the amount of sentences to be analyzed.

In general, in machine translation systems, the incorrect analysis ratio is higher than the incorrect translation ratio. Accordingly, it is efficient to emphasize support for the analysis portion. In addition to this, it is also possible to increase the quality of the translated results by improving the analysis ratio even when the user has only a knowledge of the language of the original sentences, and not of the translated sentences.

The present invention is not limited to the aforementioned embodiments, and variations and modifications may be mode without departing from the scope of the claimed invention.

What is claimed is:

1. A conversational-type of language analysis apparatus comprising:
   (a) sentence input means for inputting a sentence in a language which is an object of analysis;
   (b) dictionary means for having an attribute with respect to a syntactical unit of said language, as dictionary information;
   (c) grammar storage means for having grammatical rules which are applied to said language;
   (d) all-relationship detection means for dividing into said syntactical units said sentence input by said sentence input means, said syntactical units being nodes, and detecting, as candidate relationships, all linguistic relationships which have a possibility of existing between said nodes on the basis of said grammatical rules in said grammar storage means and said dictionary information in said dictionary means;
   (e) conversational-type analysis means for selecting first correct relationships by conversational interaction with a user, from said candidate relationships detected by said all-relationship detection means, said conversational-type analysis means including:
- (1) conversational object selection means for selecting object relationships which satisfy a predetermined condition so that the object relationships are offered for the conversational interaction with said user, from said candidate relationships, and
- (2) conversation means for selecting said first correct relationships by the conversational interaction with said user from said object relationships; and (f) analysis means for selecting second correct relationships without said conversational interaction from the candidate relationships other than said first correct relationships selected by said conversational type analysis means from said candidate relationships.

2. A conversational-type of language analysis apparatus as claimed in claim 1 wherein said conversational object selecting means includes:
- scoring means for giving a score to each of candidate relationships detected by said all-relationship detection means, said score having a value corresponding to a statistical probability that each of the candidate relationships detected by said all-relationship detection means is established,
- grouping means for dividing into groups said candidate relationships detected by said all-relationship detection means said candidate relationships belonging to each of said groups being exclusive each other in each group, and
- means for selecting object groups, each of said object groups in which the difference between a highest score and a next highest score, among scores which are given to said candidate relationships belonging to each of said object groups, is less than or equal to a predetermined value, from said candidate relationships belonging to each of said object groups one of said first correct relationships being selected by said conversation means.

3. A conversational-type of language analysis apparatus as claimed in claim 2 wherein said candidate relationships detected by said all-relationship detection means includes a grammatical rule which has a possibility of being established between said nodes, said scoring means has calculation means for calculating a statistical probability that said grammatical rule is established between said nodes.

4. A conversational-type of language analysis apparatus as claimed in claim 2 wherein each of said candidate relationships detected by said all-relationship detecting means includes linguistic attributes of said nodes and a grammatical rule which has a possibility of being between said nodes, said scoring means has second calculation means for calculating a score in accordance with a predetermined formula using a statistical probability that said grammatical rule is established between said nodes and a statistical probability that each of said nodes has a corresponding linguistic attribute.

5. A conversational-type language analysis apparatus as claimed in claim 2 wherein said conversational means selects said first correct relationships starting from one of said object groups which has the smallest difference between the highest score and the next highest score.

6. A conversational-type language analysis apparatus as claimed in claim 2 wherein said conversational object selecting means has elimination means for eliminating relationships which are exclusive to one of said first correct relationships selected by said conversation means from said candidate relationships which are object of said conversational interaction with said user, and said scoring means again giving a score to each of said candidate relationships from which said relationships are eliminated.

7. A conversational-type of language analysis apparatus as claimed in claim 1 wherein said conversation means has determination means for determining the number of times of said conversational interaction with said user.

8. A conversational-type language analysis apparatus as claimed in claim 1 wherein said analysis means includes:
- second scoring means for giving a second score to each of said candidate relationships other than said first correct relationships selected by said conversational-type analysis means, said second score having a value corresponding to a statistical probability that each of said candidate relationships other than said first correct relationships is established,
- second grouping means for dividing into second groups said candidate relationships other than said first correct relationships selected by said conversational-type analysis means, said candidate relationships belonging to each of said second groups being exclusive to each other in each second group, and
- selecting means for selecting one of said second correct relationships which has the largest second score among said candidate relationships belonging to each of said second groups.

9. A conversational-type of language analysis apparatus as claimed in claim 8 wherein said selecting means selects one of said second correct relationships starting from one of said second groups which has the largest difference between highest second score and the next highest second score.

10. A conversational-type of language analysis apparatus as claimed in claim 8 wherein said analysis means includes:
- second elimination means for eliminating relationships which are exclusive to one of said second correct relationships selected by said selecting means from said candidate relationships, said second scoring means again giving a second score to each of said relationships.

11. A conversational-type language analysis apparatus as claimed in claim 1 wherein said analysis means includes:
- third scoring means for giving a third score to each of said candidate relationships other than said first correct relationships selected by said conversational-type analysis means, said third score having a value corresponding to statistical probability that each of said candidate relationships other than said first correct relationships is established,
- third grouping means for dividing into third groups said candidate relationships other than said first correct relationships selected by said conversational-type analysis means, said candidate relationships belonging to each of said third groups being inclusive in each third group,
- total calculation means for calculating a total score of second scores given to said candidate relationships belonging to each of said third groups, and
- second selecting means for selecting one of said third groups which has largest total score, said candidate relationships belonging to said one of said third groups being said second correct relationships.

* * * * *